US007063332B2

(12) United States Patent
Müller

(10) Patent No.: US 7,063,332 B2
(45) Date of Patent: Jun. 20, 2006

(54) CHUCK FOR TOOLS, ESPECIALLY SCREWDRIVER BITS

(75) Inventor: André Müller, Wuppertal (DE)

(73) Assignee: Wera Werk Hermann Werner GmbH & Co.KG, Wuppertal (DE)

( * ) Notice: Subject to any disclaimer, the term of this patent is extended or adjusted under 35 U.S.C. 154(b) by 0 days.

(21) Appl. No.: 10/486,765

(22) PCT Filed: Aug. 7, 2002

(86) PCT No.: PCT/EP02/08818

§ 371 (c)(1), (2), (4) Date: Aug. 30, 2004

(87) PCT Pub. No.: WO03/018263

PCT Pub. Date: Mar. 6, 2003

(65) Prior Publication Data

US 2005/0023777 A1 Feb. 3, 2005

(30) Foreign Application Priority Data

Aug. 25, 2001 (DE) ................................ 101 41 668

(51) Int. Cl.
*B23B 31/07* (2006.01)

(52) U.S. Cl. ........................................ 279/75; 279/906

(58) Field of Classification Search .................. 408/22, 408/30, 75, 74, 906; 279/22, 30, 75, 74, 279/906
See application file for complete search history.

(56) References Cited

U.S. PATENT DOCUMENTS 1,656,450 A * 1/1928 Steuer ........................ 279/22
1,860,998 A * 5/1932 Drazick ...................... 279/76
2,348,611 A * 5/1944 Davidson ..................... 188/67
2,409,899 A * 10/1946 Resina ........................ 279/22
4,309,042 A * 1/1982 Fauth et al. .................. 279/75
5,284,069 A * 2/1994 Wellman ................... 76/107.1
6,325,393 B1 * 12/2001 Chen et al. ................... 279/22
6,688,610 B1 * 2/2004 Huggins et al. .............. 279/22
6,695,321 B1 * 2/2004 Bedi et al. .................... 279/22
6,755,423 B1 * 6/2004 Chiu .......................... 279/30
2001/0046421 A1 * 11/2001 Cochran et al. ........ 408/239 R (Continued)

FOREIGN PATENT DOCUMENTS

DE 2934428 3/1981

(Continued)

*Primary Examiner*—Boyer D. Ashley
*Assistant Examiner*—J Williams
(74) *Attorney, Agent, or Firm*—Martin A. Farber

(57) ABSTRACT

A chuck (1) for tools, especially screwdriver bits with a polygonal section (2), has a polygonal cavity (3) for the insertion of the polygonal section (2). A wall (4) of the polygonal cavity (3) has a window (5) in which is disposed a pressure-piece (6) which can be displaced in the insertion direction (E) and which, in order to secure the inserted polygonal section (2) against being drawn out, is forced against the polygonal section (2), in a direction transverse to the insertion direction (E), by a sloping inner wall (9) of an actuating element. The actuating element is outside the window and is retained in a clamping position by a restoring spring (10), and, in a release position of the actuating element (7), moves aside out of the polygonal cavity (3) in order for the polygonal section (2) to be drawn out. The pressure-piece (6) is subjected to the action of a compression spring (8) acting counter to the insertion direction (E) and, upon displacement counter to the direction of spring action, moves aside out of the polygonal cavity (3).

10 Claims, 4 Drawing Sheets

U.S. PATENT DOCUMENTS

2003/0178794 A1 * 9/2003 Chen et al. .................. 279/22

FOREIGN PATENT DOCUMENTS

| | | |
|---|---|---|
| DE | 3243389 | 5/1984 |
| DE | 9116606 | 4/1993 |
| DE | 4243650 | 6/1994 |
| EP | 0134975 | 3/1985 |

* cited by examiner

CHUCK FOR TOOLS, ESPECIALLY SCREWDRIVER BITS

FIELD AND BACKGROUND OF THE INVENTION

The invention relates to a chuck for tools, especially screwdriver bits with a polygonal section, having a polygonal cavity for the insertion of the polygonal section, the wall of the polygonal cavity having a window in which is disposed a pressure-piece which can be displaced in the insertion direction and which, in order to secure the inserted polygonal section against being drawn out, is forced against the polygonal section, in a direction transverse to the insertion direction, by an actuating element outside the window, in a clamping position of this element, and which, in a release position of the actuating element, can move aside out of the polygonal cavity in order for the polygonal clamping section to be drawn out.

Such a chuck is already known from DE 29 34 428 C2. In this document, the pressure-piece is configured as a ball and is positioned in a window, which is associated with one of the surfaces of the polygon, such that it can be moved in the insertion direction. The window here is in the form of a slot extending in the insertion direction in the cavity wall. Outside the window, the slot is closed by an actuating element which acts on the ball by means of a sloping flank. The actuating element, which is in the form of a sliding sleeve, is biased by spring action in the actuating direction, which extends in the insertion direction. If the polygonal section of a bit is inserted into this chuck, then an annular slope which is arranged at the rear end side of the bit displaces the ball in the insertion direction within the window, in which case the ball, running along the slope of the actuating sleeve, moves out of the polygonal cavity in order to increase the size of the free cross-section. The ball, finally, runs over the end edge of the bit and rests on the surface of the polygon of the polygonal section. If the bit is subjected to a pulling action counter to the insertion direction, then the ball rolls, on the one hand, on the slope of the actuating sleeve and, on the other hand, on the flank of the polygonal section. Since the two surfaces are located in a wedge relationship to one another, this results in clamping.

The disadvantage is that this clamping mechanism does not function when the bit is oriented upward and the ball, in the rear section of the window, lies freely between the flank of the polygonal section and the slope of the actuating sleeve.

The prior art also discloses latching-ball mechanisms in the case of which the ball is located in a window-like cutout which is made in the actuating sleeve and the extent of which in the insertion direction corresponds substantially to the ball diameter, so that the ball can be displaced substantially only transversely to the insertion direction of the bit. The ball is then forced into its blocking position exclusively by the sloping flank of the actuating sleeve. In the case of this chuck, the ball enters into a corner cutout of a bit. Accordingly, it is associated with the edge of the polygon rather than with the surface of the polygon. In the case of this chuck, the actuating sleeve has to be displaced into the release position in order for the bit to be inserted.

SUMMARY OF THE INVENTION

It is an object of the invention to develop the chuck of the generic type in a functionally advantageous manner.

The object is achieved by the invention based on the pressure-piece being subjected to the action of a compression spring acting counter to the insertion direction and, upon displacement counter to the direction of the spring action, can move aside out of the polygonal cavity. The subject matters stated in the rest relate both to advantageous developments of the subject matter and, at the same time, to separate technical solution proposals which are independent thereof and of the object mentioned above. It is proposed here, in particular, that the pressure-piece is a round piece. It may be a ball in particular. It is possible for the pressure-piece, as is known in principle from the prior art, to be formed by a sloping inner wall of an actuating sleeve which forms the actuating element. The window is preferably associated with one of the edges of the polygon of the sleeve, so that the pressure-piece can also enter into a corner cutout of the polygonal section of a bit. It is also the case, however, that bits which do not have a corner cutout are retained merely with edge abutments by the pressure-piece. By virtue of an appropriate selection of the diameter of the round piece, the latter can rest merely on those points of the corner cutout which are formed by the peripheral edges of the corner cutouts which meet at a point. Genuine punctiform support is then provided. These geometrical conditions are present, in particular, when the radius of the round piece corresponds to the width of the corner cutout. It is also possible for the actuating element to be displaced from the clamping position into the release position against the force of a restoring spring. It is advantageous here if the direction of action of the restoring spring corresponds to the direction of action of the compression spring acting on the pressure-piece. The two springs then act counter to the insertion direction. The pressure-piece may be retained in the window by means of a carrying-shoulder support, as is known in principle in the prior art. In this case, it can penetrate into the cavity to such a depth that it projects into the abovementioned corner cutout of the polygonal section. In a particularly preferred configuration, the window is located level with this corner cutout, so that the rear end surface of the bit or of the polygonal section engages against the base of the polygonal cavity. If a commercially available bit is pushed into the polygonal cavity of the chuck, then the annular beveling, formed by a chamfer, at the end of the bit displaces the ball, which forms the pressure-piece, in the insertion direction, and the ball as a result compresses the compression spring and rolls or slides along the sloping inner surface of the actuating sleeve. In this case, the ball is displaced not only in the axial direction of the cavity, but also transversely thereto, namely out of the cavity. The free cross-section for the insertion of the bit thus increases in size. As is also the case with the generically determinative state of the art, the bit, finally, can be pushed through beneath the ball until, for example, the rear end surface of the bit acts on the base of the cavity. The space between the edge of the polygon of the bit and the sloping inner wall of the actuating sleeve forms a wedge-shaped space which tapers counter to the insertion direction the compression spring presses the ball. The ball is thus retained in a clamping position by the compression spring. If then, irrespective of whether the ball is positioned in a corner cutout or merely rests on an edge of the polygon, the bit is subjected to tensile forces, this results in the ball tending to be displaced in the direction of the gap, so that the clamping force is increased. In order to free the pressure-piece, the actuating sleeve is moved into the release position. This results in the wedge-shaped gap being widened. The ball can then move aside transversely to the insertion direction. If the ball is located, for example, in a corner cutout, it can pass out of the latter. If it is merely supported with clamping action on an edge of the polygon, then the clamping action is eliminated by the actuating-sleeve displacement.

BRIEF DESCRIPTION OF THE DRAWINGS

An exemplary embodiment of the invention is explained hereinbelow with reference to attached drawings, in which.

DETAILED DESCRIPTION OF THE PREFERRED EMBODIMENT

Figure 1:
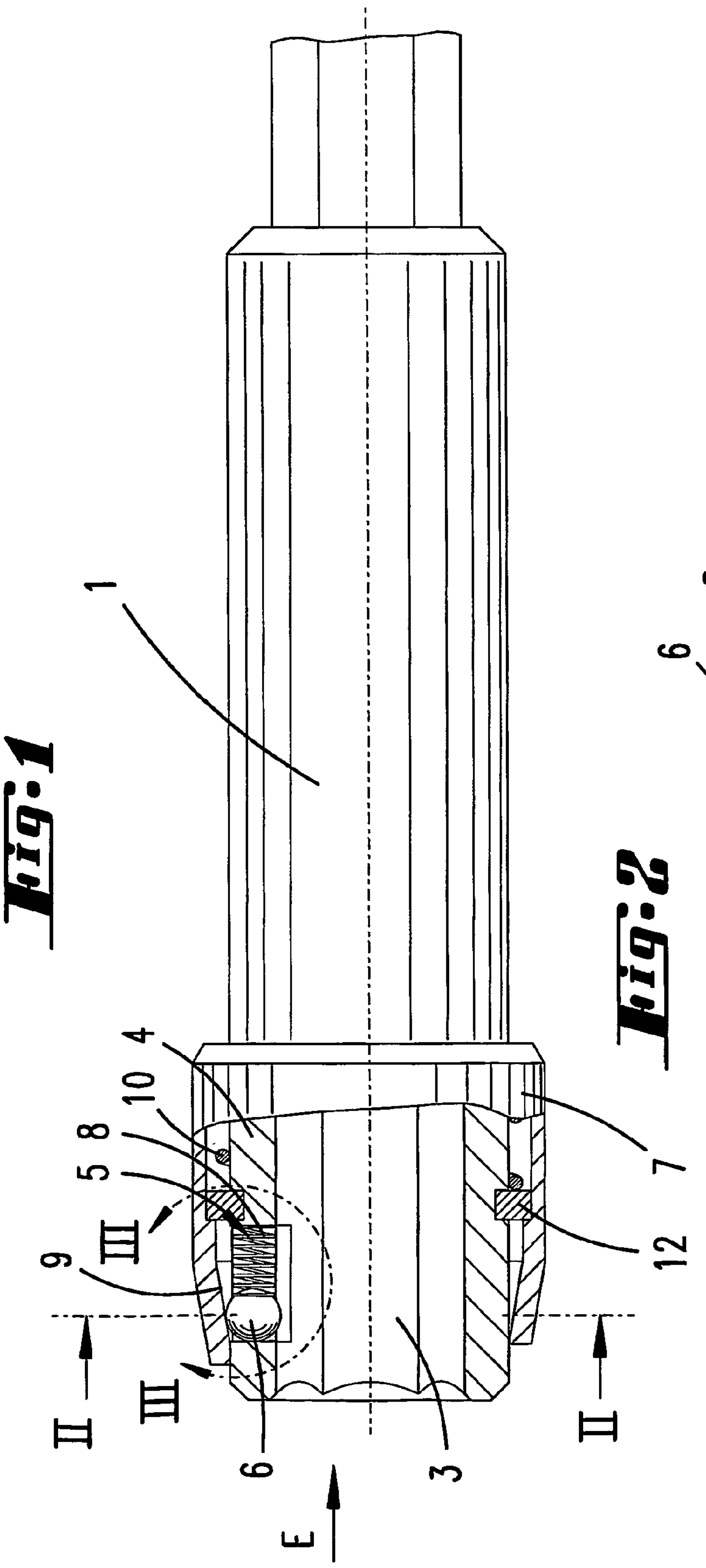
FIG. 1 shows a side view of a chuck, partly broken-away in the region of the polygonal cavity.
Figure 2:
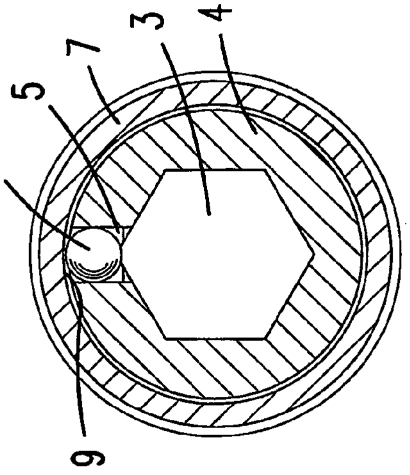
FIG. 2 shows a section along the line II—II.

The chuck 1 has a polygonal insertion section (not illustrated) in order for it to be inserted into the chuck of an electric screwdriver or of some other power tool. Opposite to this clamping section, the chuck has a polygonal cavity 3. It is possible to insert, in the insertion direction E, into the polygonal cavity 3, which has a hexagonal cross-section, a polygonal section 2 of a bit which has this same cross-section. The depth of the polygonal cavity 3 may then be selected such that the bit 2 engages with the rear end surface of the polygonal section against the cavity base. The polygonal cavity 3 has a window 5 in the region of one or more of the corners of the polygon (see FIG. 2). The width of the window 5 in the circumferential direction of the polygonal cavity 3 is only significantly greater than the ball 6 which forms the pressure-piece. In the insertion direction E, the window 5 has an extent which is considerably greater than, even more than double the size of, the diameter of the ball. Acting in this direction is a compression spring 8 which, on the one hand, is supported on a narrow wall of the window and, on the other hand, acts on the ball 6. Its direction of action is counter to the insertion direction E, so that a displacement of the ball 6 in the insertion direction E results in the compression spring 8 being compressed.

Without a bit inserted, the ball butts against the narrow wall 5' of the window 5 on the opening side. In the direction of the center of the polygonal cavity 3, the ball 6 is retained by carrying shoulders that extend along the longitudinal walls of the window 5 and are spaced apart from one another by a clear distance which is slightly smaller than the diameter of the ball. In the opposite direction, the ball is retained by an actuating sleeve 7. The actuating sleeve 7 has a sloping inner wall 9. This sloping inner wall 9 may be of rotationally symmetrical configuration, so that the actuating sleeve 7 can be rotated on the sections of the chuck 1 which form the polygonal cavity 3. The diameter of the ball 6 is greater than the thickness of the wall of the polygonal cavity. A wedge-shaped gap is formed between the slope 9 and the imaginary line of the edge of the polygon which is interrupted by the window, and this gap is tapered counter to the insertion direction E. In the tapered region, the extent of the gap-like clearance is smaller than the diameter of the ball 6, so that the ball, subjected to the action of the slope 9, can penetrate, according to region, into the polygonal cavity 3. In the broad region of the gap, the latter has a width which is greater than, or at least equal to, the diameter of the ball, so that the ball 6 can pass out of the polygonal cavity 3 altogether by virtue of a corresponding displacement of the actuating sleeve 7.

The emerging of the ball out of the polygonal cavity occurs in two ways. On the one hand, by displacement of the ball in the insertion direction, the ball 6 sliding or rolling along the slopes 9. This is associated with a compression of the compression spring 8. On the other hand, the emerging of the ball 6 out of the polygonal cavity 3 results from a displacement of the actuating sleeve 7 counter to the insertion direction E. In this case, the slope 9 is displaced in the direction of the mouth opening of the polygonal cavity 3 in conjunction with a compression of the restoring spring 10, which retains the actuating sleeve 7 in the clamping position.

Figure 3:
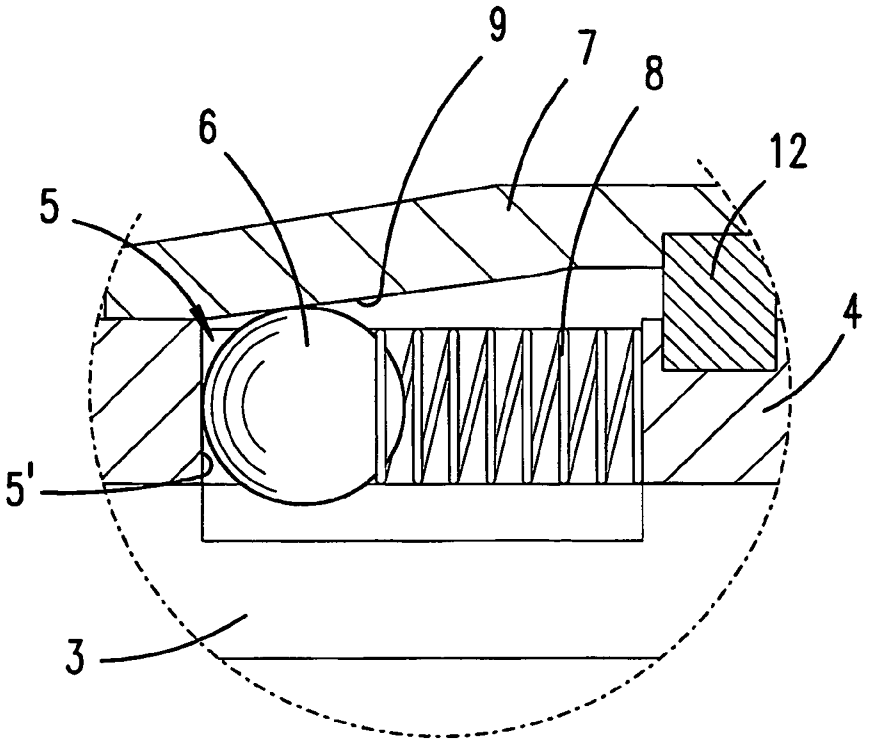
FIG. 3 shows the detail designated III—III in FIG. 1, on a greatly enlarged scale, with the actuating element located in the clamping position but without any bit inserted.
Figure 5:
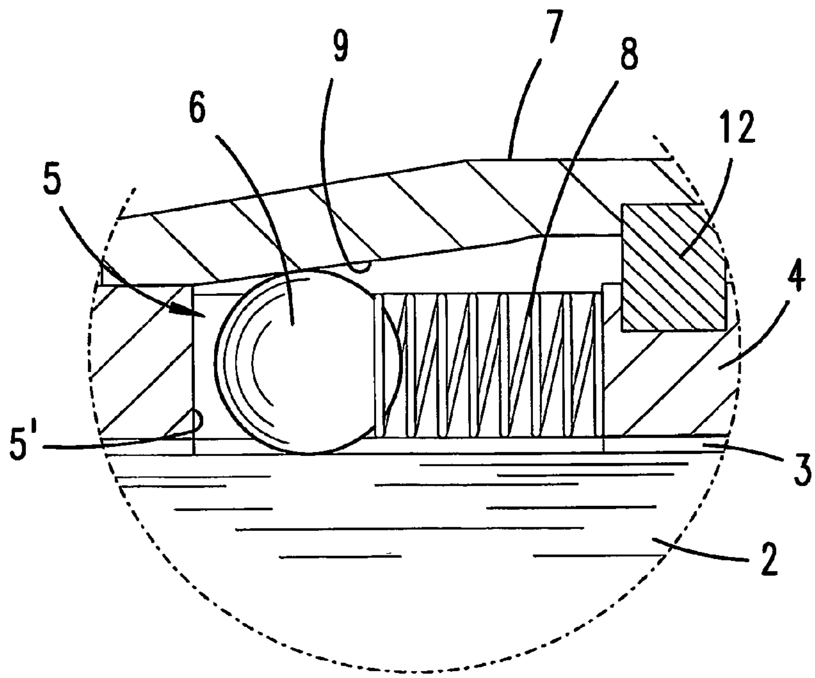
FIG. 5 shows an illustration according to FIG. 3 with the actuating element displaced into the clamping position and a bit inserted.

The chuck functions as follows:

Without a bit inserted, the ball 6 is located in the position illustrated in FIG. 3. If a bit is then inserted into the polygonal cavity 3, the slope 13 at the end of the polygonal section 2 displaces the ball 6 in the insertion direction. The ball 6 then slides along the sloping inner wall 9 of the actuating sleeve 7, which is retained stationary, the compression spring 8 being subjected to stressing in the process. It slides along the slope 9 until it has passed out of the polygonal cavity 3 to a sufficient extent in order to slide the edge of the polygon of the polygonal section 2. This state is illustrated in FIG. 5. It can be seen there that the ball 6 is spaced apart from the narrow wall 5' of the window 5. The compression spring 8 retains the ball 6 in a clamping position between the edge of the polygon of the polygonal section 2 and the sloping inner wall 9. If the bit is then subjected to a tensile force, the clamping action increases.

Figure 4:
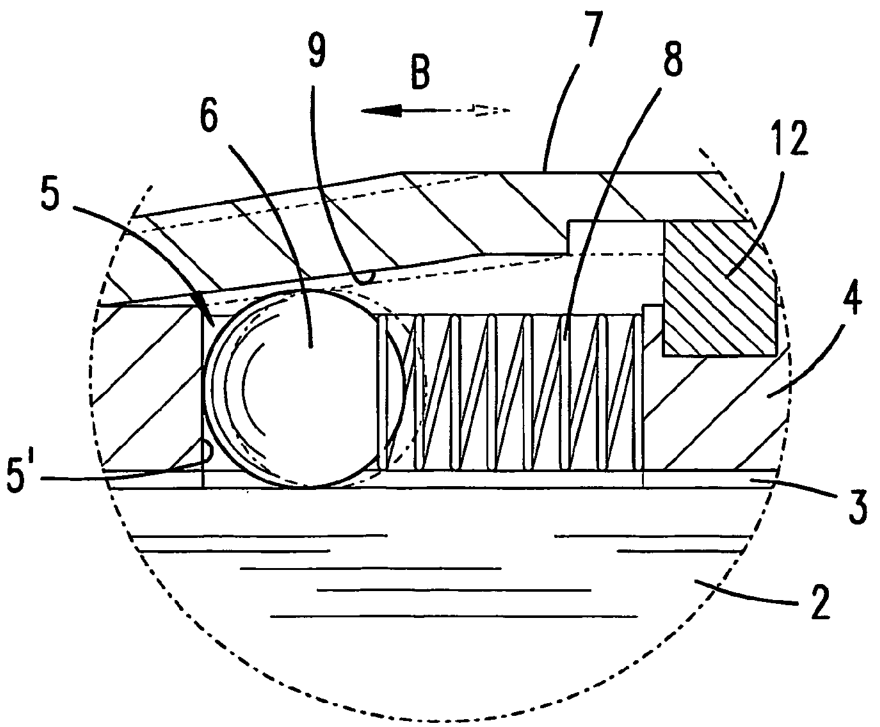
FIG. 4 shows the illustration according to FIG. 3, but with the actuating element displaced into the release position and a bit inserted.

If the bit is to be removed from the chuck, then the actuating sleeve 7 should be displaced into its release position counter to the insertion direction E. This is illustrated in FIG. 4. The ball 6 is then displaced momentarily into its position in which it acts on the narrow wall 5' of the window 5. It can then move aside in a direction transverse to the insertion direction E. It has a sufficient amount of play so that the bit can be drawn out of the polygonal cavity 3.

Figure 6:
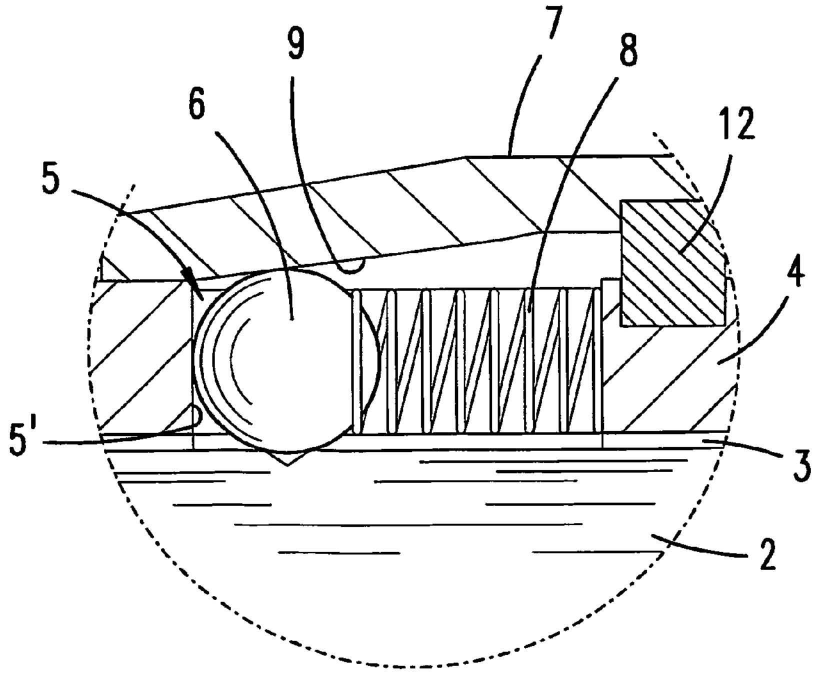
FIG. 6 shows an illustration according to FIG. 5, the pressure-piece entering, in certain regions, into a corner cutout of the bit.
Figure 7:
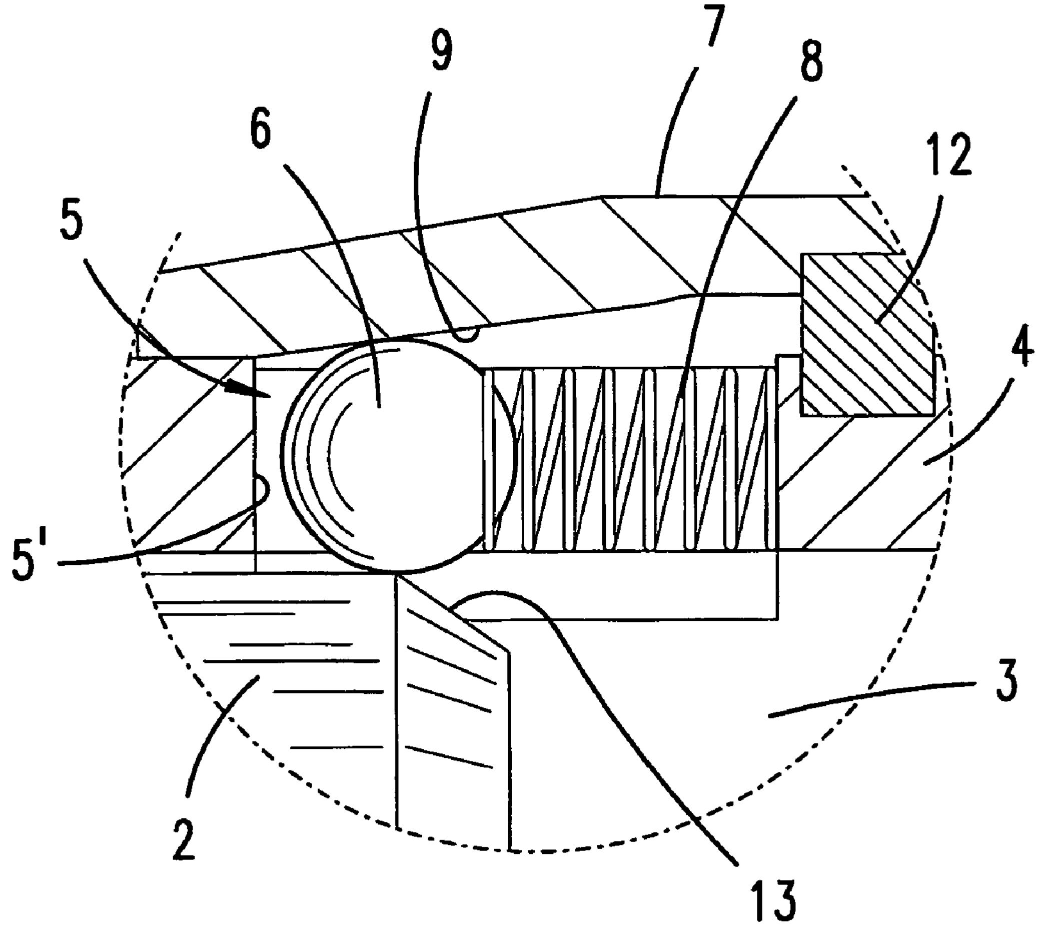
FIG. 7 shows an illustration according to FIG. 3 with a bit being inserted and the pressure-piece moving aside over the rear, chamfer-forming end edge of the bit.

FIG. 6 shows a variant in which a polygonal section 2 of a bit with a corner cutout 11 has been inserted into the polygonal cavity 3. The ball 6 can then—also with abutment against the wall 5' of the window 5—penetrate into the corner cutout 11 and thus, subjected to the action of the sloping inner wall 9 on one side and penetrating, as it were, in a positively locking manner into the corner cutout 11, develop a means for preventing the bit from being drawn out. Here too, the bit is inserted without there being a requirement for the actuating sleeve 7 to be actuated since, here too, the ball 6 can be displaced in the manners illustrated in FIG. 7 by the slope 13 at the end of the polygonal section 2.

It is also the case in this variant that the ball is freed by actuation, that is to say by displacement of the actuating sleeve 7, counter to the insertion direction E. It can then emerge out of the corner cutout 11 in a direction transverse to the insertion direction E.

The configuration according to the invention is accompanied by the advantage that the chuck can securely retain both polygonal sections which have a corner cutout and those which do not have a corner cutout, this being done using one and the same ball.

All features disclosed are (for themselves) pertinent to the invention. The disclosure content of the associated/attached priority documents (copy of the prior application) are hereby also included in full in the disclosure of the application, also for the purpose of incorporating features of these documents in claims of the present application.

The invention claimed is:

1. Chuck (1) for tools, especially screwdriver bits with a polygonal section (2), the chuck comprising:

a polygonal cavity (3) for the insertion of the polygonal section (2), a wall (4) of the polygonal cavity (3) having a window (5) in which is disposed a pressure-piece (6) which is displaceable in an insertion direction (E);

wherein, in order to secure the inserted polygonal section (2) against being drawn out, the pressure-piece (6) is forced against the polygonal section (2), in a direction transverse to the insertion direction (E), by a sloping inner wall (9) of an actuating element;

wherein the actuating element is outside the window and is retained in a clamping position by a restoring spring (10) acting in the insertion direction (E), and which, in a release position of the actuating element (7), can move aside out of the polygonal cavity (3) in order for the polygonal section (2) to be drawn out; and wherein the pressure-piece (6) is subjected to the action of a compression spring (8) acting counter to the insertion direction (E) and, upon a displacement counter to the direction of spring action of the compression spring, the pressure-piece (6) can move aside out of the polygonal cavity (3).

2. Chuck according to claim 1, wherein the pressure-piece (6) is a round piece.

3. Chuck according to claim 1, wherein the pressure-piece (6) is a ball.

4. Chuck according to claim 1, wherein the pressure-piece (6) is subjected to the action of a sloping inner wall (9) of an actuating sleeve which forms the actuating element (7).

5. Chuck according to claim 1, wherein the window (5) is associated with one of the edges of the polygon of the cavity (3).

6. Chuck according to claim 1, wherein the actuating element (7) is displaceable from the clamping position into the release position counter to the force of the restoring spring (10).

7. Chuck (1) for tools, especially screwdriver bits with a polygonal section (2), the chuck comprising:

a polygonal cavity (3) for the insertion of the polygonal section (2), a wall (4) of the polygonal cavity (3) having a window (5) in which is disposed a pressure-piece (6) which is displaceable in an insertion direction (E);

wherein, in order to secure the inserted polygonal section (2) against being drawn out, the pressure-piece (6) is forced against the polygonal section (2), in a direction transverse to the insertion direction (E), by a sloping inner wall (9) of an actuating element;

wherein the actuating element is outside the window and is retained in a clamping position by a restoring spring (10), and which, in a release position of the actuating element (7), can move aside out of the polygonal cavity (3) in order for the polygonal section (2) to be drawn out;

wherein the pressure-piece (6) is subjected to the action of a compression spring (8) acting counter to the insertion direction (E) and, upon a displacement counter to the direction of spring action of the compression spring, the pressure-piece (6) can move aside out of the polygonal cavity (3); and wherein the restoring spring (10) and the compression spring (8) act in the same direction.

8. Chuck according to claim 1, wherein the pressure-piece (6) can penetrate, through the window (5), into a corner cutout (11) of the polygonal section (2).

9. Chuck (1) for tools, especially screwdriver bits with a polygonal section (2), the chuck comprising:

a polygonal cavity (3) for the insertion of the polygonal section (2), a wall (4) of the polygonal cavity (3) having a window (5) in which is disposed a pressure-piece (6) which is displaceable in an insertion direction (E);

wherein, in order to secure the inserted polygonal section (2) against being drawn out, the pressure-piece (6) is forced against the polygonal section (2), in a direction transverse to the insertion direction (E), by a sloping inner wall (9) of an actuating element;

wherein the actuating element is outside the window and is retained in a clamping position by a restoring spring (10), and which, in a release position of the actuating element (7), can move aside out of the polygonal cavity (3) in order for the polygonal section (2) to be drawn out;

wherein the pressure-piece (6) is subjected to the action of a compression spring (8) acting counter to the insertion direction (E) and, upon a displacement counter to the direction of spring action of the compression spring, the pressure-piece (6) can move aside out of the polygonal cavity (3) ; and wherein the window (5) is configured as a slot extending in the insertion direction (E).

10. Chuck (1) for tools, especially screwdriver bits with a polygonal section (2), the chuck comprising:

a polygonal cavity (3) for the insertion of the polygonal section (2), a wall (4) of the polygonal cavity (3) having a window (5) in which is disposed a pressure-piece (6) which is displaceable in an insertion direction (E);

wherein, in order to secure the inserted polygonal section (2) against being drawn out, the pressure-piece (6) is forced against the polygonal section (2), in a direction transverse to the insertion direction (E), by a sloping inner wall (9) of an actuating element;

wherein the actuating element is outside the window and is retained in a clamping position by a restoring spring (10), and which, in a release position of the actuating element (7), can move aside out of the polygonal cavity (3) in order for the polygonal section (2) to be drawn out;

wherein the pressure-piece (6) is subjected to the action of a compression spring (8) acting counter to the insertion direction (E) and, upon a displacement counter to the direction of spring action of the compression spring, the pressure-piece (6) can move aside out of the polygonal cavity (3); and wherein the window (5) is located level with a corner cutout (11) provided in at least one of the edges of the polygon of the polygonal section (2).

* * * * *